(12) United States Patent
Fukami

(10) Patent No.: US 7,724,070 B2
(45) Date of Patent: May 25, 2010

(54) CHARGE-PUMP CIRCUIT AND BOOSTING METHOD FOR CHARGE-PUMP CIRCUIT

(75) Inventor: Ikuo Fukami, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 11/304,697

(22) Filed: Dec. 16, 2005

(65) Prior Publication Data

US 2006/0164154 A1 Jul. 27, 2006

(30) Foreign Application Priority Data

Jan. 24, 2005 (JP) ............................. 2005-015013

(51) Int. Cl.
*H02M 3/18* (2006.01)
(52) U.S. Cl. .............................. 327/536; 363/59; 363/60
(58) Field of Classification Search ................. 327/536, 327/537, 178; 363/59–61
See application file for complete search history.

(56) References Cited

U.S. PATENT DOCUMENTS

| 5,111,375 | A | 5/1992 | Marshall | 363/60 |
|---|---|---|---|---|
| 5,404,329 | A * | 4/1995 | Yamagata et al. | 365/189.09 |
| 6,693,480 | B1 * | 2/2004 | Wong | 327/390 |
| 6,747,897 | B2 * | 6/2004 | Karaki | 365/185.18 |
| 7,227,211 | B2 * | 6/2007 | Tsutsumi et al. | 257/296 |
| 2004/0004512 | A1 * | 1/2004 | Tanaka | 327/536 |

FOREIGN PATENT DOCUMENTS

| JP | 6-153493 | 5/1994 |
|---|---|---|
| JP | 2000-123587 | 4/2000 |

OTHER PUBLICATIONS

German Office Action dated May 31, 2007 (with partial English translation).

* cited by examiner

*Primary Examiner*—Lincoln Donovan
*Assistant Examiner*—Patrick O'Neill
(74) *Attorney, Agent, or Firm*—McGinn IP Law Group, PLLC

(57) ABSTRACT

A charge charge-pump circuit according to an embodiment of the invention includes: a first boosting capacitor; a second boosting capacitor series-connected with the first boosting capacitor; a first boosting clock driver connected between the first boosting capacitor and the second boosting capacitor and boosting the first boosting capacitor; and a second boosting clock driver connected with the second boosting capacitor and boosting the first boosting capacitor and the second boosting capacitor after the first boosting clock driver boosts the first boosting capacitor.

18 Claims, 13 Drawing Sheets

CHARGE-PUMP CIRCUIT AND BOOSTING METHOD FOR CHARGE-PUMP CIRCUIT

BACKGROUND OF THE INVENTION

1. Field of the Invention

The present invention relates to a highly-efficient multi-stage charge-pump circuit and a boosting method for the charge-pump circuit.

2. Description of Related Art

In recent years, a boosting circuit using a charge-pump circuit has been widely used as a high-side IPD (intelligent power device) equipped in an automobile. In order to generate a higher boosted voltage in a charge-pump circuit, the charge-pump circuit of the multi-stage configuration is required. FIG. 8 is a circuit diagram showing an existing, typical single-stage charge-pump circuit 800.

As shown in FIG. 8, the conventional single-stage charge-pump circuit 800 includes: a boosting clock driver 801 for receiving a clock signal OSC from an input terminal to drive a boosting capacitor 811; a first backflow preventative circuit 802 for applying a voltage corresponding to a power supply voltage VCC to the boosting capacitor 811 to prevent the backflow of charges; and a second backflow preventative circuit 803 for applying a boosted voltage to an output terminal OUT to prevent the backflow of charges in a like manner. The first backflow preventative circuit 802 and the second backflow preventative circuit 803 include N-channel metal oxide semiconductor field effect transistors (MOSFETs).

The boosting clock driver 801 includes a P-channel MOSFET 821 and N-channel MOSFET 822 series-connected between a power supply potential and a ground potential. Drain terminals of these two MOSFETs are connected together, and their gates are connected to the input terminal. The boosting clock driver 801 outputs a signal obtained by inverting an input signal from the output (V81). In other words, the boosting clock driver 801 functions as an inverter.

The first backflow preventative circuit 802 is connected between the power supply potential VCC and one end of the boosting capacitor 811. The other end of the boosting capacitor 811 is connected with the output (V81) of the boosting clock driver 801. The first backflow preventative circuit 802 has an N-channel MOSFET having connected gate and drain with the drain being connected with the power supply potential. The N-channel MOSFET of the first backflow preventative circuit 802 attains a so-called diode connection. Its source terminal is connected with the boosting capacitor 811, and a node therebetween is denoted by V82.

The second backflow preventative circuit 803 is connected between the node V82 and the output OUT. The second backflow preventative circuit 803 has an N-channel MOSFET. The N-channel MOSFET has connected gate and drain with the drain being connected with the node V82. Further, its source terminal is connected with the output OUT. The N-channel MOSFET of the second backflow preventative circuit 803 attains the diode connection. A capacitive load 813 is connected between the source and the ground potential, and a node therebetween is the output OUT. Further, a well terminal connected to a backgate of the N-channel MOSFET is connected with the power supply potential. Hence, a parasitic diode hardly operates to realize a stable operation of the entire circuit.

FIG. 9 is a timing chart of the existing, typical single-stage charge-pump circuit. As shown in FIG. 9, the clock signal OSC supplied from the input terminal is a time-varying signal that changes its level between the power supply potential VCC and the ground potential at a constant frequency. The clock signal OSC reaches a High level (e.g., power supply potential) at a timing t1, and the boosting clock driver 801 outputs a voltage of Low level (e.g., ground potential) from the output (V81). The boosting capacitor 811 is charged with the first backflow preventative circuit 802. Provided that a threshold voltage of the N-channel MOSFET of the first backflow preventative circuit 802 is represented by Vtn 801 (for example, 0.8 V), a voltage obtained at the node V82 at the timing t1 is expressed by Expression (1) below:

$$V82 = VCC - Vtn801 \qquad \text{Expression (1)}$$

After that, the clock signal OSC shifts to a LOW level at the timing t2, and a terminal of the boosting capacitor 811 on the boosting clock driver 801 side is at the power supply potential. At this time, charges corresponding to the voltage derived from Expression (1) above are accumulated in the boosting capacitor 811, so the voltage at the node V82 is derived from Expression (2):

$$V82 = 2 \times VCC - Vtn801 \qquad \text{Expression (2)}$$

This voltage is higher than the power supply voltage. However, the first backflow preventative circuit 802 prevents charges from flowing back to the power supply potential side, so the charges of the boosting capacitor 811 are never discharged to the power supply potential. Further, this voltage is applied to the capacitive load 813 through the second backflow preventative circuit 803. Charges corresponding to this voltage are accumulated in the capacitive load 813. Provided that a threshold voltage of the N-channel MOSFET of the second backflow preventative circuit 803 is represented by Vtn 802 (for example, 1.9 V), a voltage VOUT at the output OUT is derived from Expression (3):

$$VOUT = 2 \times VCC - Vtn801 - Vtn802 \qquad \text{Expression (3)}$$

Japanese unexamined patent publication No. H06-153493 discloses such a single-stage charge-pump circuit. The charge-pump circuit disclosed in this publication aims at saving power consumed by a limiter for stabilizing a boosted voltage.

FIG. 10 is a circuit diagram of an existing, typical two-stage charge-pump circuit 1000. As shown in FIG. 10, the existing two-stage charge-pump circuit 1000 includes a second boosting clock driver 1001, a second boosting capacitor 1011, and a third backflow preventative circuit 1002 in addition to components of the single-stage charge pump circuit 800 of FIG. 8. The same components as those of the single-stage charge pump circuit are denoted by like reference numerals, and their detailed description is omitted her. The second boosting clock driver 1001 has a gate connected with the output (V81) of the first boosting clock driver 801. The second boosting clock driver 1001 has a P-channel MOSFET 1021 and N-channel MOSFET 1022 series-connected between the power supply potential VCC and the ground potential. The second boosting clock driver 1001 outputs a signal from a node V101 at which drain terminals of these two MOSFETs are connected together. That is, the boosting clock driver 1001 functions as an inverter.

The third backflow preventative circuit 1002 is connected between the node V82 between the first boosting capacitor 811 and the first backflow preventative circuit 802, and the second backflow preventative circuit 803. The third backflow preventative circuit 1002 has an N-channel MOSFET. The N-channel MOSFET has connected gate and drain with the drain being connected with the node V82. Further, its source is connected with a drain of the N-channel MOSFET of the second backflow preventative circuit 803. That is, the N-channel MOSFET of the third backflow preventative circuit 1002 attains diode connection. A well terminal connected with a backgate of the N-channel MOSFET of the third backflow preventative circuit 1002 is connected with a power supply potential. Hence, a parasitic diode hardly operates to realize a stable operation of the entire circuit. Further, one end of the boosting capacitor 1011 is connected with the node V102 between the second backflow preventative circuit 803 and the third backflow preventative circuit. The other end of the boosting capacitor 1011 is connected with the output (V101) of the boosting clock driver 1001.

FIG. 11 is a timing chart of the existing two-stage charge-pump circuit 1000. As regards the operation of the two-stage charge-pump circuit, the voltage at the node V82 increases up to a level represented by Expression (1) above at the timing t1 similar to the operation of the foregoing single-stage charge-pump circuit. Next, at the timing t2, the voltage at the node V82 increases to a level represented by Expression (2) above similar to the operation of the foregoing single-stage charge-pump circuit. At this time, provided that a threshold voltage of the N-channel MOSFET of the third backflow preventative circuit 1002 is represented by Vtn 803 (for example, 1.9 V), a voltage that is calculated by replacing the threshold voltage Vtn 802 with the threshold voltage Vtn 803 is applied across the second boosting capacitor 1011. The same voltage is applied to the node V102. Next, at the timing t3, the first boosting clock driver 1001 outputs a voltage of High level from the output (V101). At this time, charges corresponding to the aforementioned voltage are accumulated in the second boosting capacitor 1011. Thus, the voltage at the node V102 is represented by Expression (4):

$$V102 = 3 \times VCC - Vtn801 - Vtn803 \quad \text{Expression (4)}$$

This voltage is higher than the power supply voltage. However, since the first backflow preventative circuit 802 and the third backflow preventative circuit 803 prevent the charges from flowing back to the power supply potential side, the charges of the boosting capacitor 1011 are by no means discharged to the power supply potential. Further, this voltage is applied to the capacitive load 813 through the second backflow preventative circuit 803, and charges corresponding to the applied voltage are accumulated in the capacitive load. At this time, the voltage VOUT at the output OUT is derived from Expression (5):

$$VOUT = 3 \times VCC - Vtn801 - Vtn802 - Vtn803 \quad \text{Expression (5)}$$

As mentioned above, in order to increase a boosted voltage, the following structure is generally adopted. That is, plural boosting capacitors are connected via the backflow preventative diodes between the power supply potential of the charge-pump circuit and the output terminal.

FIG. 12 is a graph showing a result of comparing a boosted voltage relative to the power supply voltage in a general single-stage charge-pump circuit with that in a general two-stage charge-pump circuit. As shown in FIG. 12, the boosted voltage is a voltage that is 1.4 to 1.6 times the power supply voltage with the single-stage one and is a voltage that is 1.8 to 2.1 times the power supply voltage with the two-stage one. In this case, the boosted voltage in the two-stage one is 1.3 times higher than that in the single-stage one. As mentioned above, the existing charge-pump circuit requires a multi-stage configuration for the purpose of obtaining a higher boosted voltage. Japanese unexamined patent publication No. 2000-123587 discloses a technique for providing such a multi-stage charge-pump circuit.

FIG. 13 is a schematic plan view of the layout of the single-stage charge-pump circuit. FIG. 14 is a schematic plan view of the layout of the two-stage charge-pump circuit. In these existing semiconductor devices, a large capacitive element composed of a MOS capacitor occupies the most of a semiconductor chip area. The two-stage one requires an area 1.7 to 1.8 times larger than that of the single-stage one.

However, in order to increase a boosted voltage, the existing charge-pump circuit needs to have the multi-stage configuration. The multi-stage boosting circuit has a problem in that a chip area increases in proportion to an increase in the number of capacitive elements, so a semiconductor chip costs high.

SUMMARY OF THE INVENTION

A charge-pump circuit according to an aspect of the present invention includes: a first boosting capacitor; a second boosting capacitor series-connected with the first boosting capacitor; a first boosting clock driver connected between the first boosting capacitor and the second boosting capacitor and boosting the first boosting capacitor; and a second boosting clock driver connected with the second boosting capacitor and boosting the first boosting capacitor and the second boosting capacitor after the first boosting clock driver boosts the first boosting capacitor.

According to the present invention, the first boosting capacitor and the second boosting capacitor are connected in series to enable the use of stacked capacitive elements, which saves an area for the capacitive elements that would make up a sizable proportion of the chip area. Hence, it is possible to reduce a chip size with a boosting efficiency equal to or higher than that of any existing charge-pump circuit.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
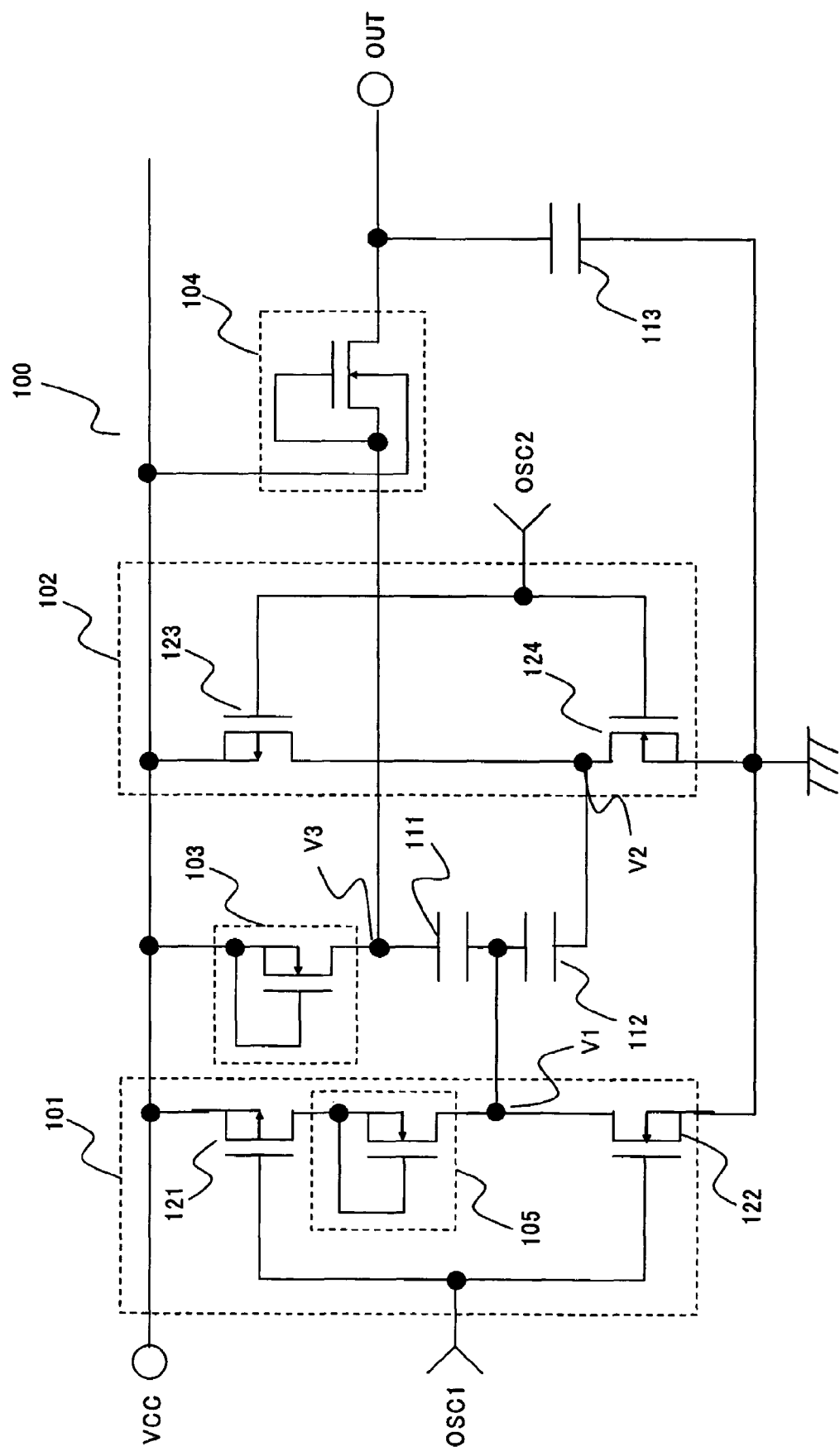
FIG. 1 is a circuit diagram showing a charge-pump circuit according to a first embodiment of the present invention.

FIG. 1 is a circuit diagram showing a charge-pump circuit according to a first embodiment of the present invention. As shown in FIG. 1, a charge-pump circuit 100 includes a first boosting capacitor 111, a second boosting capacitor 112 series-connected with the first boosting capacitor 111, a first boosting clock driver 101 connected between the first boosting capacitor 111 and the second boosting capacitor 112 and boosting the first boosting capacitor 111, and a second boosting clock driver 102 connected with the second boosting capacitor 112 and boosting the first boosting capacitor 111 and the second boosting capacitor 112. The charge-pump circuit 100 further includes a capacitive load 113 connected with an output OUT and accumulating charges from the output terminal, a first backflow preventative circuit 103 for preventing backflow of charges from the first boosting capacitor to the power supply potential, and a second backflow preventative circuit 104 for preventing backflow of charges from the capacitive load 113 to another block, and a third backflow preventative circuit 105 for preventing charges from flowing out from the second boosting capacitor to the power supply potential.

One end of the first boosting capacitor 111 is connected with a power supply potential VCC via the first backflow preventative circuit 103, and the other end thereof is connected with one end of the second boosting capacitor 112. Further, the other end of the first boosting capacitor 111 is connected with an output (V1) of the first boosting clock driver 101, and the other end of the second boosting capacitor 112 is connected with an output (V2) of the second boosting clock driver 102.

Further, a node V3 between the first boosting capacitor 111 and the first backflow preventative circuit 103 is connected with an output OUT of the charge-pump circuit 100 via the second backflow preventative circuit 104, and the capacitive load 113 is connected between the output OUT and a ground potential.

The first boosting clock driver 101 includes a P-channel MOSFET 121 as a first transistor and an N-channel MOSFET 122 as a second transistor, which are series-connected between the power supply potential VCC and the ground potential. A source of the P-channel MOSFET 121 is connected with the power supply potential VCC, and a source of the N-channel MOSFET 122 is connected with the ground potential. Further, a gate of the P-channel MOSFET 121 is connected with a gate of the N-channel MOSFET 122 by the wire that receives a clock OSC1. That is, the first boosting clock driver 101 is an inverter circuit where a drain of the P-channel MOSFET 121 is connected with a drain of the N-channel MOSFET 122, and a node V1 therebetween is an output terminal of the first boosting clock driver 101.

The second boosting clock driver 102 has a P-channel MOSFET 123 and an N-channel MOSFET 124, which are series-connected between the power supply potential VCC and the ground potential. A source of the P-channel MOSFET 123 is connected with the power supply potential VCC, and a source of the N-channel MOSFET 124 is connected with the ground potential. Further, a gate of the P-channel MOSFET 123 is connected to a gate of the N-channel MOSFET 124 by the wire that receives a clock OSC2. In short, the second boosting clock driver 102 functions as an inverter circuit. The node V2 between the P-channel MOSFET 123 and the N-channel MOSFET 124 is an output terminal of the second boosting clock driver 102.

The first backflow preventative circuit 103 includes, for example, an N-channel MOSFET having connected gate and drain with the drain being connected with the power supply potential. Its source is connected with the node V3. Its backgate is connected with the power supply potential. The first backflow preventative circuit 103 prevents charges from flowing out from the first boosting capacitor 111 to the power supply potential.

The second backflow preventative circuit 104 includes, for example, an N-channel MOSFET having connected gate and drain with the drain being connected with the node V3. Its source is connected with the output OUT of the charge-pump circuit 100. Its backgate is connected with the power supply potential. The second backflow preventative circuit 104 prevents charges from flowing out from the capacitive load 113 to the power supply potential.

The third backflow preventative circuit 105 includes, for example, an N-channel MOSFET where a drain is connected with a drain of the P-channel MOSFET 121, and a gate is connected with the drain. The third backflow preventative circuit 105 prevents charges from flowing out from the second boosting capacitor 112 to the power supply potential. Here, in this embodiment, the third backflow preventative circuit 105 is connected between the output (V1) of the first boosting clock driver 101 and the drain of the P-channel MOSFET 121, but may be connected between the source of the P-channel MOSFET 121 and the power supply potential VCC. That is, the third backflow preventative circuit 105 may be provided between the power supply potential VCC and the node V1.

Figure 2:
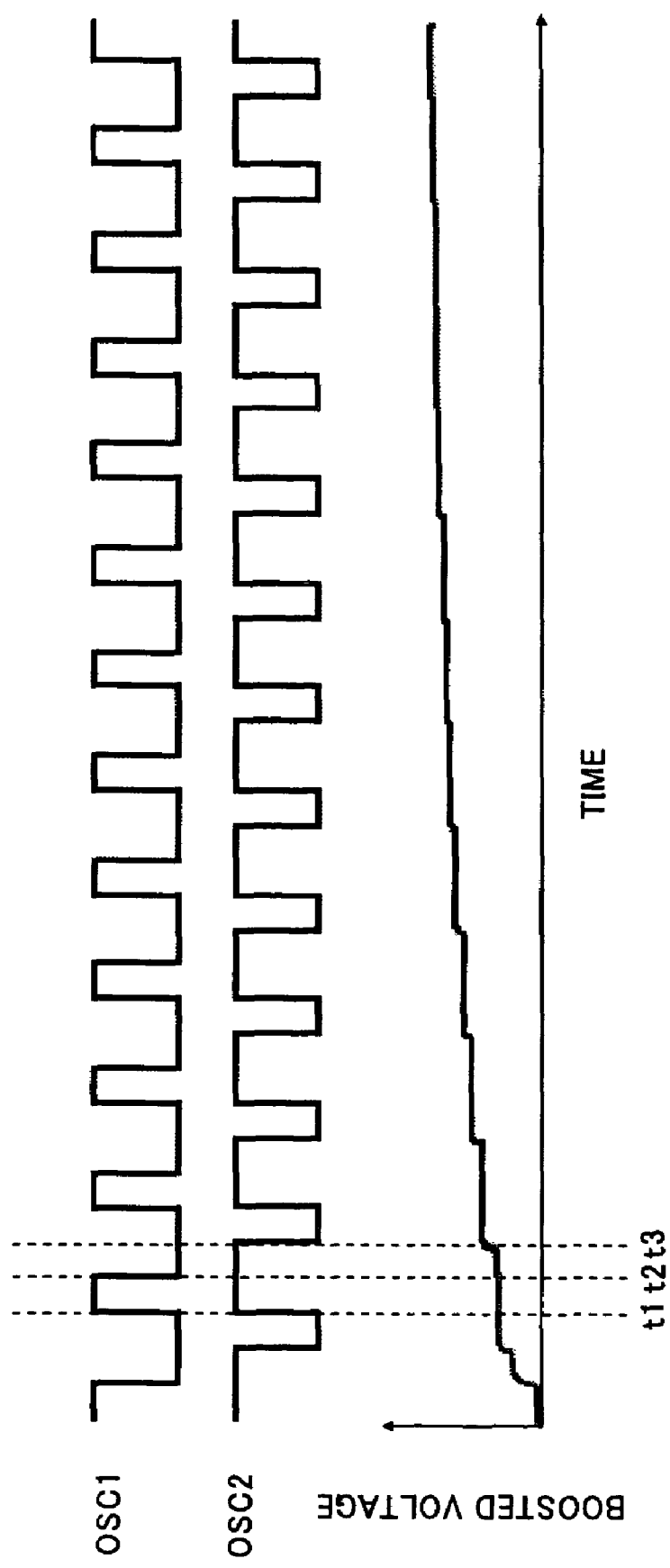
FIG. 2 is a timing chart showing an operation of the charge-pump circuit according to the first embodiment of the present invention.

Next, an operation of the charge-pump circuit according to the first embodiment is described. In the charge-pump circuit 100 of the first embodiment, two N-channel MOSFETs different in connection form are used as the backflow preventative circuit. First, a gate is connected with a drain, and a backgate is connected with the drain. In this specification, this connection form is referred to as a diode connection A. Second, a gate is connected with a drain, and a backgate is connected with a power supply potential, and a source or drain voltage is lower than a backgate voltage. In this specification, this connection form is referred to as a diode connection B. In this case, for example, it is possible that the first backflow preventative circuit 103 and the third backflow preventative circuit 105 are each composed of a MOSFET based on the diode connection A, while the second backflow preventative circuit 104 is composed of a MOSFET based on the diode connection B. With such connection, in general, a threshold voltage of the diode connection A is lower than that of the diode connection B. For example, the threshold voltage of the diode connection A is 0.8 V, and the threshold voltage of the diode connection B is 1.9 V. To elaborate, it is effective for minimizing a boosted voltage loss due to the backflow preventative circuit to adopt a larger number of MOSFETs based on the diode connection A. Referring to a timing chart of FIG. 2, the operation of the charge-pump circuit is described below in consideration of the above.

In the charge-pump circuit 100, the first boosting clock driver 101 is supplied with the clock OSC1, and the second boosting clock driver 102 is supplied with the clock OSC2. The clock OSC1 and the clock OSC2 are clock signals that periodically change a voltage level between a High level (for example, power supply potential) and a Low level (for example, ground potential). Further, the clock OSC2 has a longer High level period than that of the clock OSC1, and the rising edges of the clock OSC1 and clock OSC2 match with each other, but a falling edge of the clock OSC1 appears ahead of that of the clock OSC2.

First, at a timing t1, the clock OSC1 is switched to the High level, and the clock OSC2 is switched to the High level. Then, the first boosting clock driver 101 outputs a voltage of Low level from the output (V1). Further, the second boosting clock driver 102 outputs a voltage of Low level from the output (V2). At this time, a voltage corresponding to (the power supply voltage VCC—the threshold voltage Vtn2 of the N-channel MOSFET (first backflow preventative circuit 103) based on the diode connection A) is generated across the first boosting capacitor 111. Hence, the first boosting capacitor 111 accumulates charges corresponding to the voltage of (VCC−Vtn)

Next, at a timing t2, the clock OSC1 is switched to the Low level, and the clock OSC2 is at the High level. Then, the first boosting clock driver 101 outputs a voltage corresponding to (the power supply voltage VCC—the threshold voltage Vtn1 of the N-channel MOSFET (third backflow preventative circuit 105) of the diode connection A) from the output (V1). Further, the second boosting clock driver 102 outputs a voltage of Low level from the output (V2). At this time, the voltage of (VCC−Vtn1) is generated across the second boosting capacitor 112, and the second boosting capacitor 112 accumulates charges corresponding to the voltage of (VCC−Vtn1). Further, the first boosting clock driver 101 outputs the voltage of (VCC−Vtn1) from the output (V1), and the first boosting capacitor 111 accumulates charges corresponding to the voltage of (VCC−Vtn2). Thus, a voltage at the node V3 is derived from Expression (6):

$$V3 = 2 \times VCC - Vtn2 - Vtn1 \quad \text{Expression (6)}$$

In this case, the voltage at the node V3 is higher than the power supply voltage VCC. However, the first backflow preventative circuit 103 prevents current from flowing to the power supply potential side.

At a timing t3, the clock OSC1 is at the Low level, and the clock OSC2 is switched to the Low level. Then, the first boosting clock driver 101 outputs a voltage of High level from the output (V1), and the second boosting clock driver 102 outputs a voltage of High level from the output (V2). At this time, the first boosting capacitor 111 accumulates charges corresponding to the voltage of (VCC−Vtn2), and the second boosting capacitor 112 accumulates charges corresponding to the voltage of (VCC−Vtn1). Hence, the voltage at the node V1 equals "(VCC−Vtn1)+VCC", and the voltage at the node V3 is derived from Expression (7):

$$V3 = 3 \times VCC - Vtn1 - Vtn2 \quad \text{Expression (7)}$$

In this case, the voltage at the node V1 is higher than the power supply voltage VCC. However, the third backflow preventative circuit 105 prevents current backflow, so current never flows out from the node V1 to the power supply potential. Further, the voltage at the node V3 is higher than the power supply voltage VCC, and the first backflow preventative circuit 103 prevents current from flowing out from the node V3 to the power supply potential.

In the charge-pump circuit of the first embodiment, the first boosting clock driver 101 connected between the first boosting capacitor 111 and the second boosting capacitor 112 charges the first boosting capacitor 111, and the first boosting clock driver 101 boosts the first boosting capacitor 111. Further, the second boosting capacitor 112 is charged by boosting the first boosting capacitor 111, after which the second boosting clock driver 102 connected with the second boosting capacitor 112 boosts the second boosting capacitor 112 to further boost the first boosting capacitor 111. Based on the above operation, a voltage represented by Expression (7) above is generated.

The node V3 is connected with the output of the charge-pump circuit through the second backflow preventative circuit 104. Further, the capacitive load 113 is connected between the output of the charge-pump circuit and the ground potential. Hence, the charge-pump circuit outputs a voltage VOUT that is calculated by subtracting the threshold voltage Vtn3 of the N-channel MOSFET (second backflow preventative circuit 104) based on the diode connection B from the node V3 as expressed by Expression (8):

$$VOUT = 3 \times VCC - Vtn1 - Vtn2 - Vtn3 \quad \text{Expression (8)}$$

That is, the capacitive load 113 connected with the output of the charge-pump circuit accumulates charges corresponding to the voltage derived from Expression (8) above. The operation from the timing t1 to t3 is repeated from the timing t3 onward.

With the above operation, the charge-pump circuit of the first embodiment boosts the power supply voltage up to the voltage derived from Expression (8) above in two steps. Here, in the charge-pump circuit of the first embodiment, first and second boosting capacitors 111 and 112 are connected in series. Thus, upon the actual formation of capacitive elements, a so-called stacked structure where one capacitive element is stacked on another can be realized in a simple manner. That is, in an existing charge-pump circuit, two boosting capacitors are connected in parallel for stepping up a voltage in two steps. In contrast, the series-connection of this embodiment realizes the stacked structure, so the capacitive elements can be provided with almost the same chip area as that of the capacitive elements in the charge-pump circuit for boosting a voltage in a single step.

Figure 3:
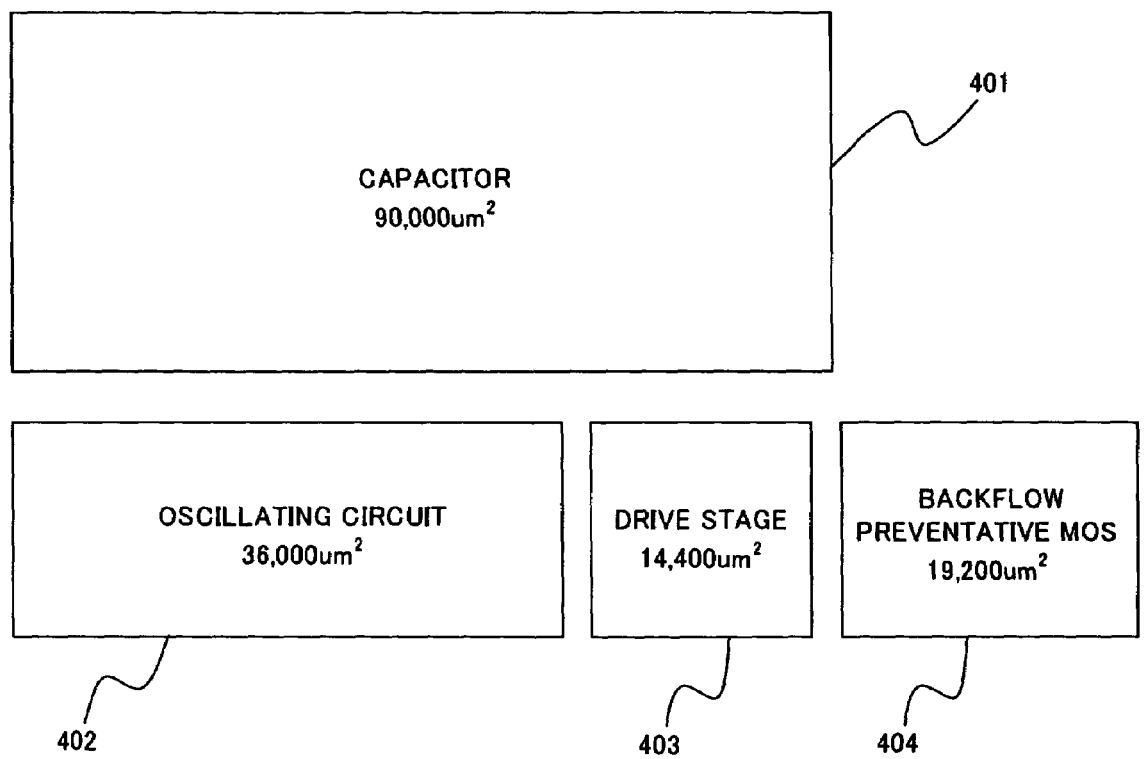
FIG. 3 is a schematic diagram showing the layout of the charge-pump circuit according to the first embodiment of the present invention.
Figure 13:
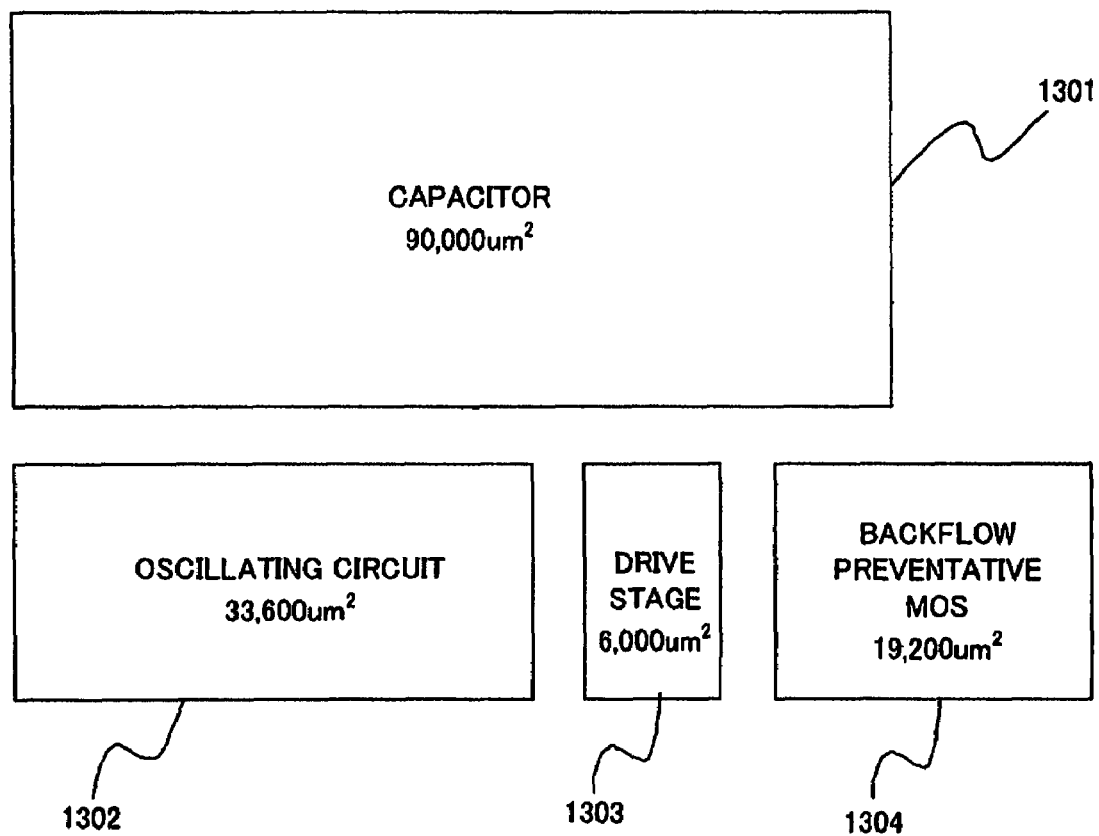
FIG. 13 is a schematic diagram showing the layout of the existing single-stage charge-pump circuit.

FIG. 3 is a schematic diagram showing the layout of the charge-pump circuit 100 of the first embodiment. For comparison purposes, FIG. 13 is a schematic diagram showing the layout of an existing single-stage charge-pump circuit 800, and FIG. 14 is a schematic diagram showing the layout of an existing two-stage charge-pump circuit 1000.

Considering an area of each block in the layout of the charge-pump circuit 100 of FIG. 1, as shown in FIG. 3, for example, the boosting capacitors 111 and 112, and the capacitive load 113 as capacitors account for 90,000 $\mu m^2$ of the total, an oscillating circuit for oscillating the clock OSC1 and clock OSC2 accounts for 36,000 $\mu m^2$, the first and second boosting clock drivers 101 and 102 as a drive stage account for 14,400 $\mu m^2$, and the backflow preventative circuits 103 to 105 as backflow preventative MOSs account for 19,200 $\mu m^2$. In contrast, as for an area of each block in the layout of the existing single-stage charge-pump circuit 800, as shown in FIG. 13, for example, a boosting capacitor 811 and a capacitive load 813 as capacitors account for 90,000 $\mu m^2$, an oscillating circuit for oscillating a clock OSC1 accounts for 33,600 $\mu m^2$, a boosting clock driver 801 as a drive stage accounts for 6,000 $\mu m^2$, and backflow preventative circuits 802 and 803 as backflow preventative MOSs account for 19,200 μm². Further, as for an area of each block in the layout of the existing two-stage charge-pump circuit 1000, as shown in FIG. 14, for example, boosting capacitors 811 and 1011, and the capacitive load 813 as capacitors account for 180,000 μm², an oscillating circuit for oscillating the clock OSC1 accounts for 33,600 μm², first and second boosting clock drivers 801 and 1001 as a drive stage account for 12,000 μm², and backflow preventative circuits 802, 803, and 1002 as backflow preventative MOSs account for 28,800 μm².

Figure 14:
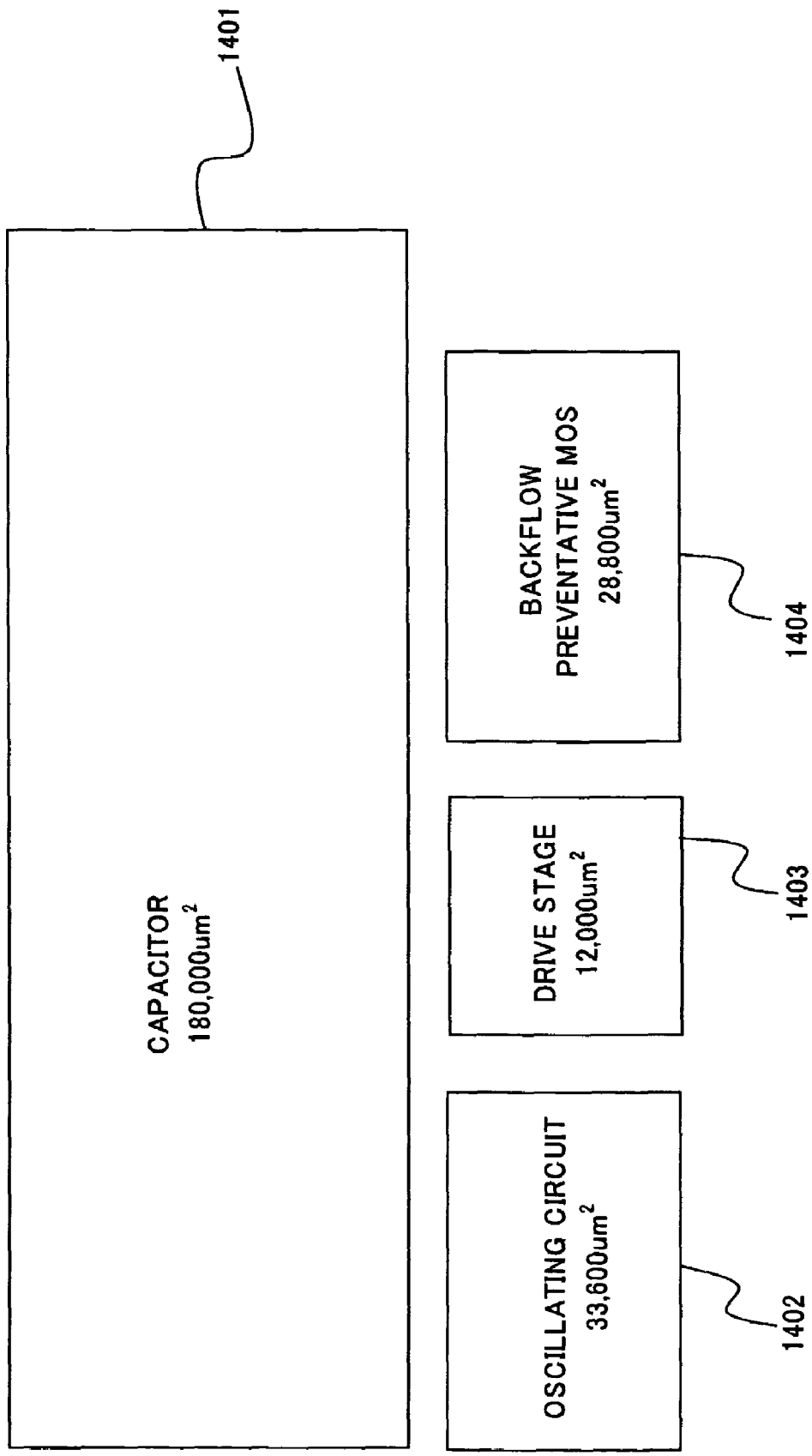
FIG. 14 is a schematic diagram showing the layout of the existing two-stage charge-pump circuit.

In this way, although the layout of the charge-pump circuit 100 of this embodiment requires an area for the drive stage and oscillating circuit which is a little larger than that of the existing two-stage one of FIG. 14, an area for the capacitor that would make up a large proportion of the chip area is almost equivalent to that of the existing single-stage one. In an existing semiconductor device, a large capacitive element including a gate insulating film makes up a large proportion of a semiconductor chip surface area, and the two-stage one requires a capacitive element area that is 1.7 to 1.8 times larger than that of the single-stage one. However, the circuit of the first embodiment only requires a capacitive element area that is 1.1 times higher than that of the single-stage one. Comparing the above results in terms of an increase in area over the existing single-stage one, the circuit of this embodiment shows only an area increase that is about 1/10 of an increase of the existing two-stage one, and thus significant improvements can be expected.

Further, a threshold voltage of the MOSFET based on the diode connection A is about 0.8 V, and a threshold voltage of the MOSFET based on the diode connection B is about 1.9 V. In the existing two-stage charge-pump circuit, two backflow preventative circuits based on the diode connection B are necessary, while the charge-pump circuit of the first embodiment only requires one backflow preventative circuit based on the diode connection B. As a result, a boosted voltage loss in the backflow preventative circuit is smaller with the charge-pump circuit of the first embodiment than the existing two-stage charge-pump circuit. In other words, the boosted voltage of the charge-pump circuit of the first embodiment is higher than the existing charge-pump circuit by a difference in threshold voltage between the diode connection A and the diode connection B. Assuming that the power supply voltage is, for example, 5 V, the boosted voltage equals 10.4 V (=15 V−0.8 V−1.9 V−1.9 V) with the two-stage charge-pump circuit, while the boosted voltage equals 11.4 V (=15 V−0.8 V−0.8 V−1.9 V) with the charge-pump circuit of the first embodiment. The charge-pump circuit of the first embodiment attains the boosted voltage that is 1.1 V higher than the existing two-stage one. That is, according to the charge-pump circuit of the first embodiment, a voltage efficiency can be enhanced.

Figure 4:
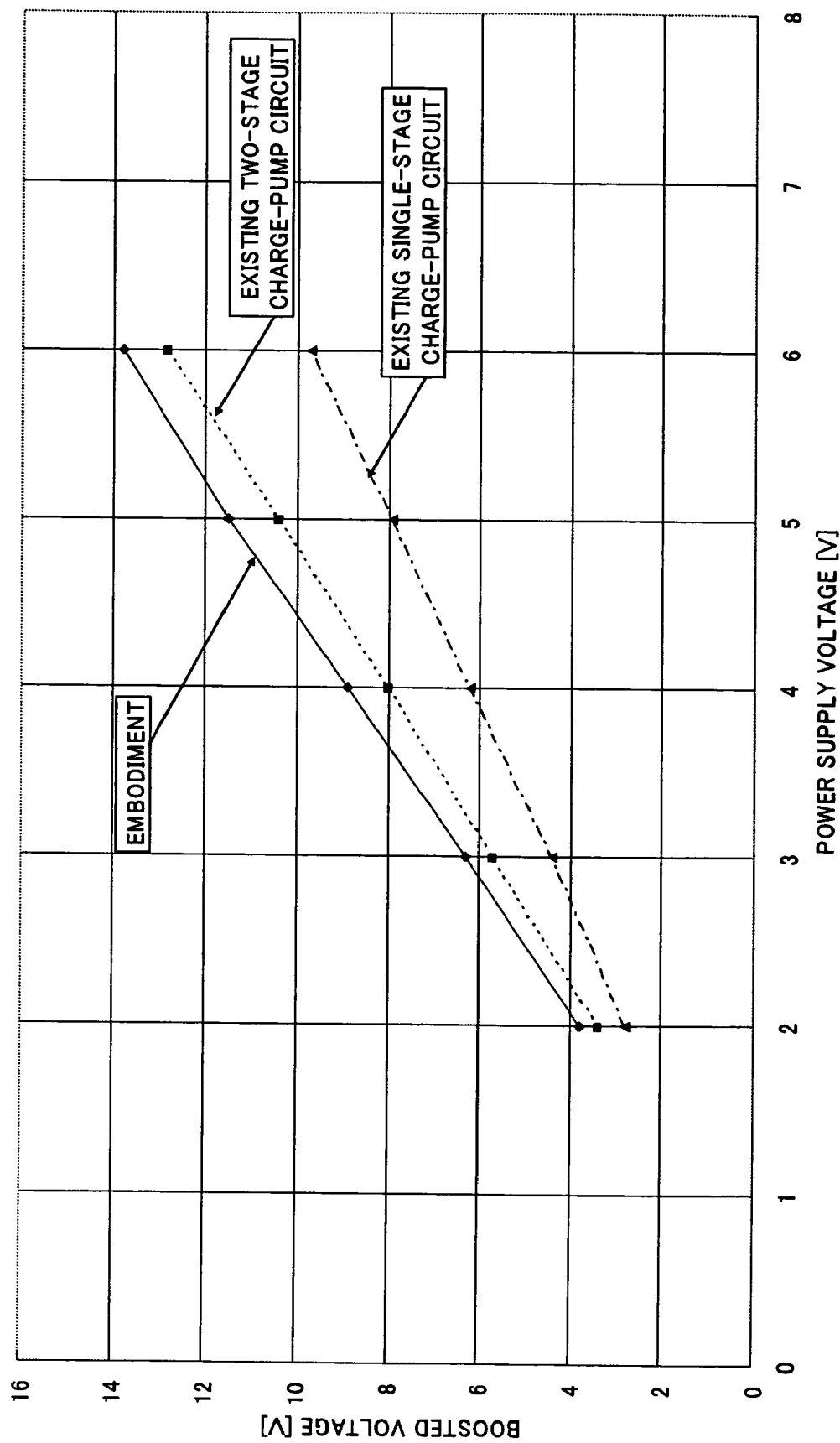
FIG. 4 is a graph showing a result of comparing a boosted voltage relative to a power supply voltage of the charge-pump circuit according to the first embodiment of the present invention with that of an existing circuit.

FIG. 4 shows a result of comparing the boosted voltage of the present invention with that of the related art. The single-stage one shows a 1.4- to 1.6-fold increase in voltage, and the two-stage one shows a 1.8- to 2.1-fold increase in voltage, while the circuit of the present invention shows a 2.1- to 2.3-fold increase, the increase of the present invention is about 1.13 times larger than that of the two-stage one.

The charge-pump circuit of the present invention has the two boosting capacitors 111 and 112 connected in series. Hence, upon the actual formation of capacitive elements, a so-called stacked structure where one capacitive element is stacked on another can be realized in a simple manner.

As discussed above, the charge-pump circuit of the present invention attains a higher boosted voltage than that of the existing two-stage one with a chip area almost equivalent to that of the single-stage one. Thus, it is possible to mount a charge-pump circuit with a high boosting efficiency to the semiconductor chip at a low cost.

Second Embodiment

Figure 5:
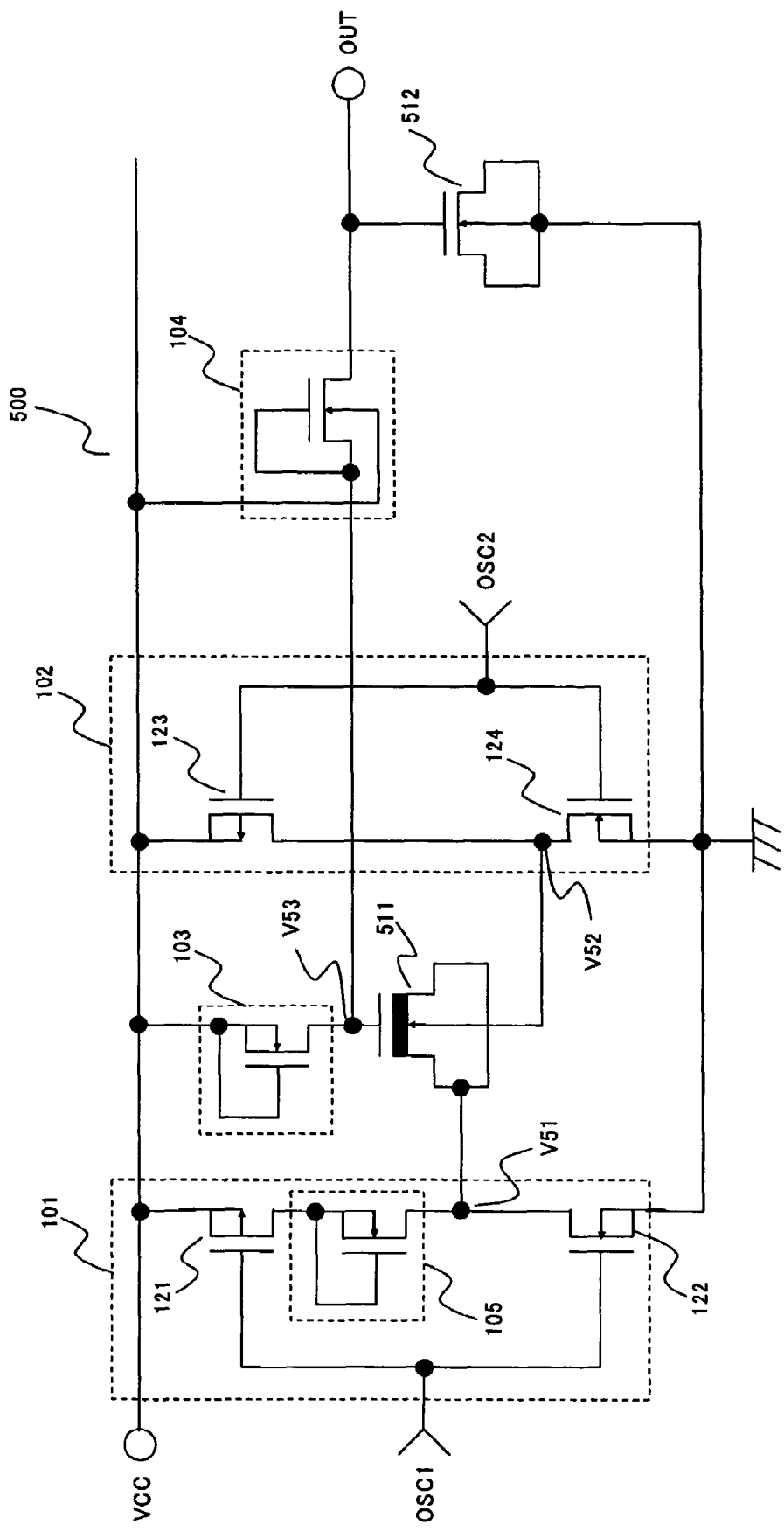
FIG. 5 is a circuit diagram showing a charge-pump circuit according to a second embodiment of the present invention.

FIG. 5 is a circuit diagram showing a charge-pump circuit 500 according to a second embodiment of the present invention. The charge-pump circuit 500 of the second embodiment differs from the charge-pump circuit 100 of the first embodiment exclusively in terms as an element serving as a boosting capacitor or a capacitive load. That is, in the charge-pump circuit 100 of the first embodiment, capacitor element is used for the first boosting capacitor, the second boosting capacitor, and the capacitive load. In contrast, in the charge-pump circuit 500 of the second embodiment, a parasitic capacitance of a depletion-type MOSFET element is used for the first boosting capacitor and the second boosting capacitor. Further, a parasitic capacitance of an enhancement-type MOSFET element is used for a capacitive load. The other components are the same as those of the first embodiment and operate in a like manner.

Next, first and second boosting capacitors of this embodiment, that is, capacitive elements using a parasitic capacitance of the depletion-type MOSFET are described.

Figure 6:
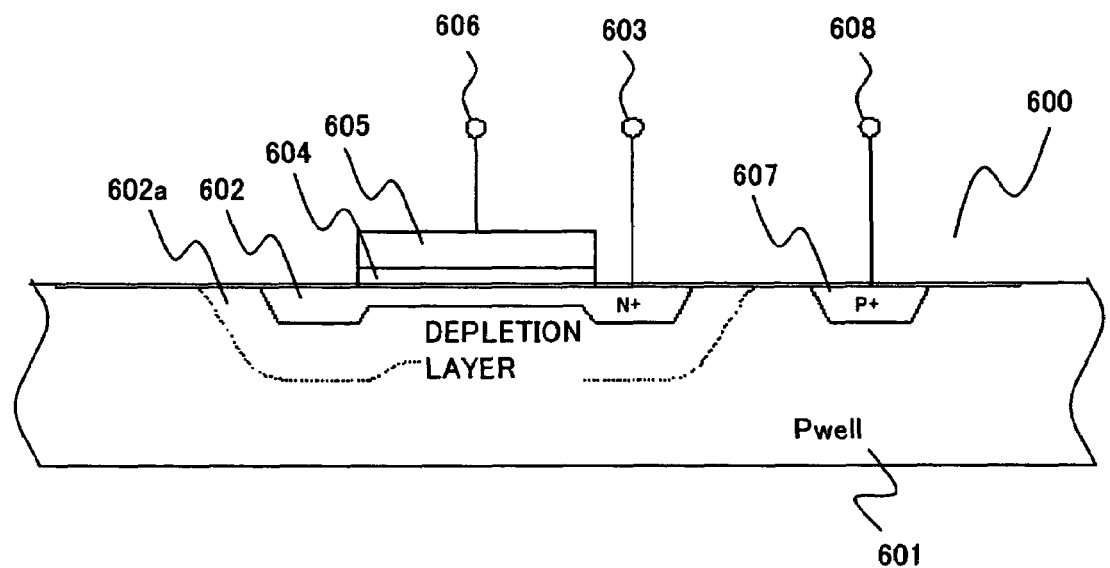
FIG. 6 is a sectional view showing a depletion-type MOSFET according to the second embodiment of the present invention.

FIG. 6 is a schematic sectional view of the depletion-type MOSFET. In a a depletion-type MOSFET 600, source/drain regions (S/D regions) 602 made of N+ semiconductor are formed in predetermined positions of a P-well 601 region made of P-type semiconductor constituting a substrate, and a source or drain terminal 603 is connected thereto. A depletion layer 602a is formed due to holes having positive charges in the P-well region 601 opposite to the S/D regions 602. Further, a gate oxide film as an insulating layer is formed in a predetermined position above the S/D regions 602, and a gate electrode 605 is formed on the gate oxide film 604. The gate electrode 605 is connected with a gate terminal 606. Further, a backgate terminal region 607 made of a P+ semiconductor having a higher impurity concentration than that of the P-well is formed in a predetermined position of the P-well region 601, and a well terminal 608 is connected with the backgate terminal region 607.

Figure 7:
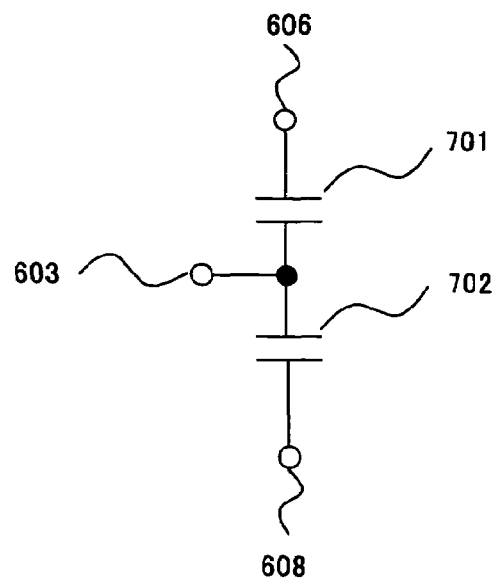
FIG. 7 is a schematic diagram showing a parasitic capacitance of the depletion-type MOSFET according o the second embodiment of the present invention.
Figure 8:
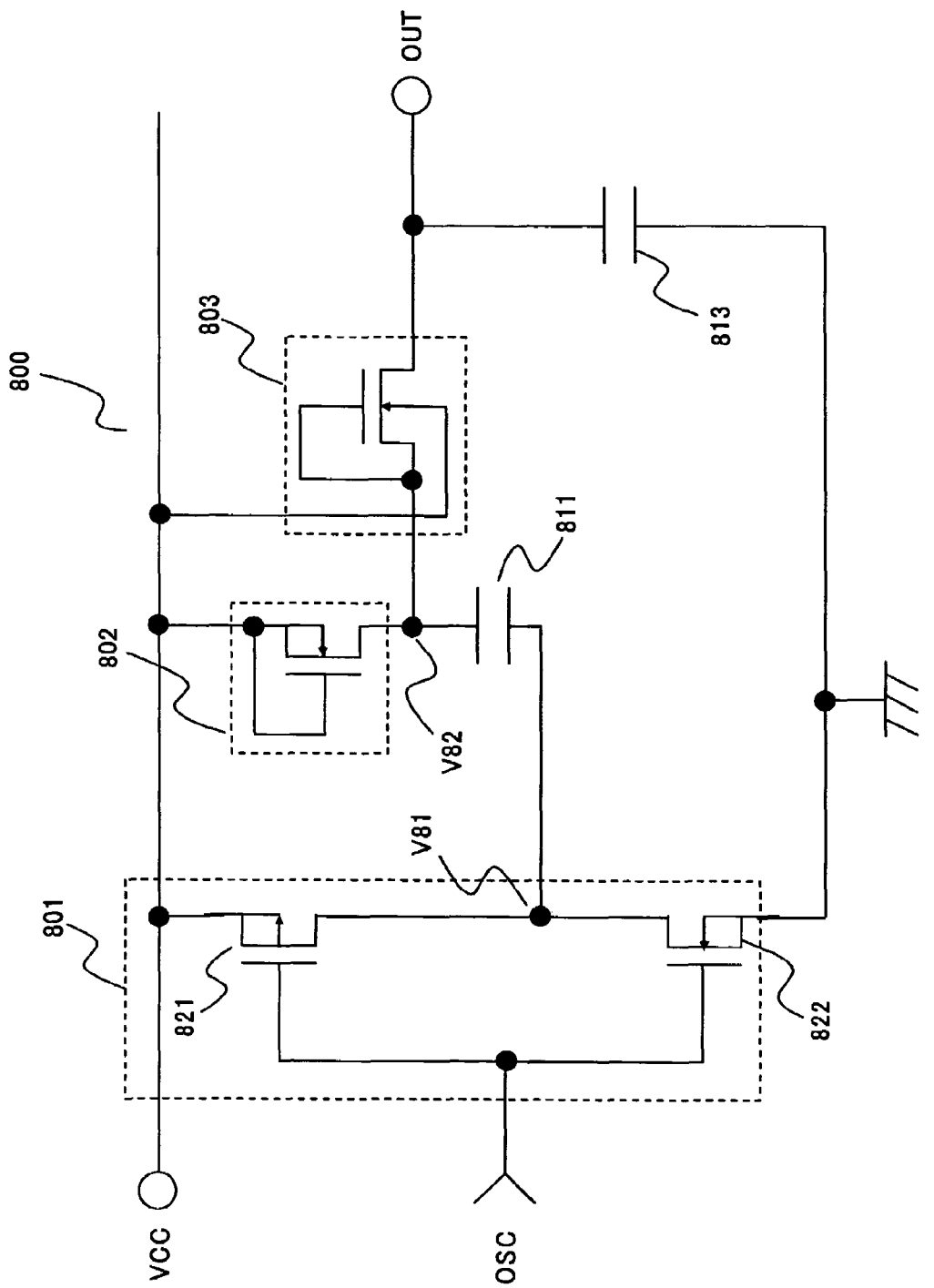
FIG. 8 is a circuit diagram showing an existing single-stage charge-pump circuit.
Figure 9:
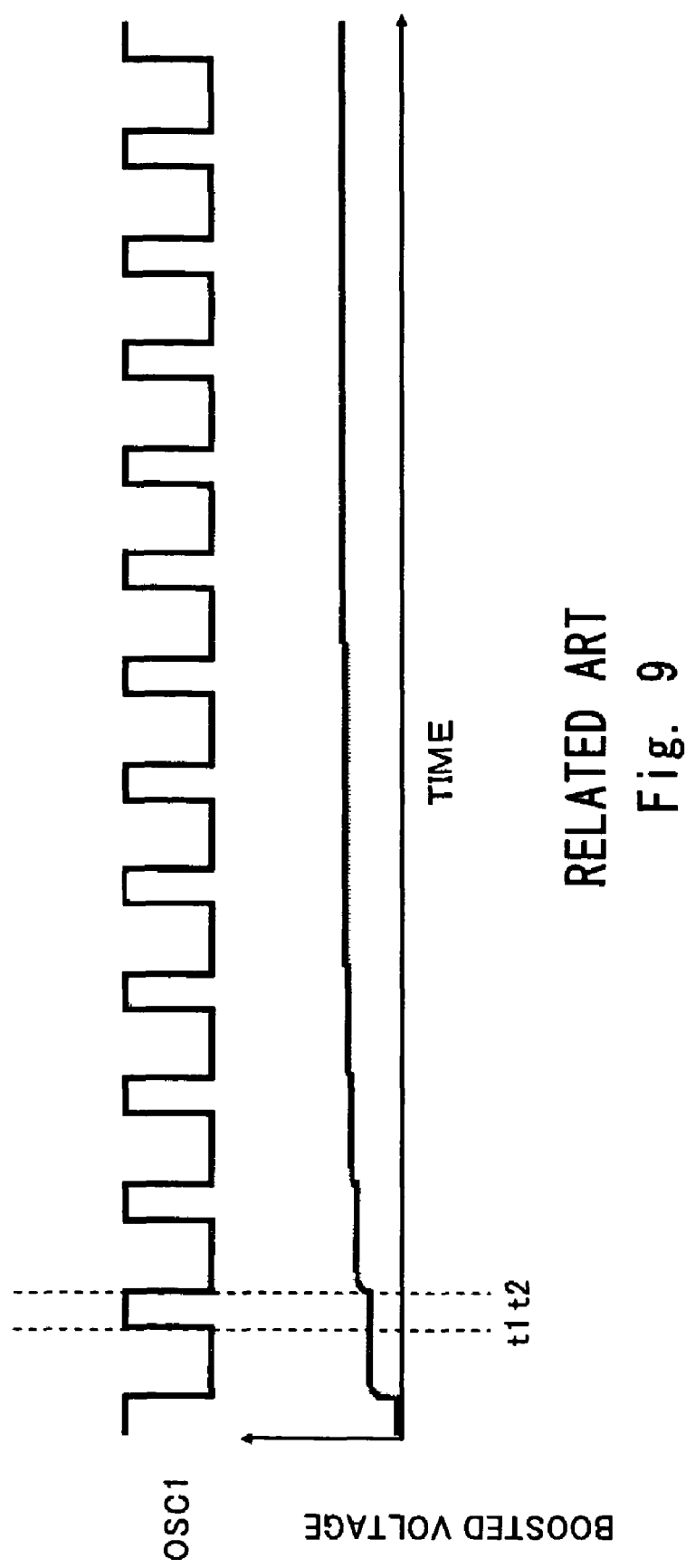
FIG. 9 is a timing chart showing an operation of the existing single-stage charge-pump circuit.
Figure 10:
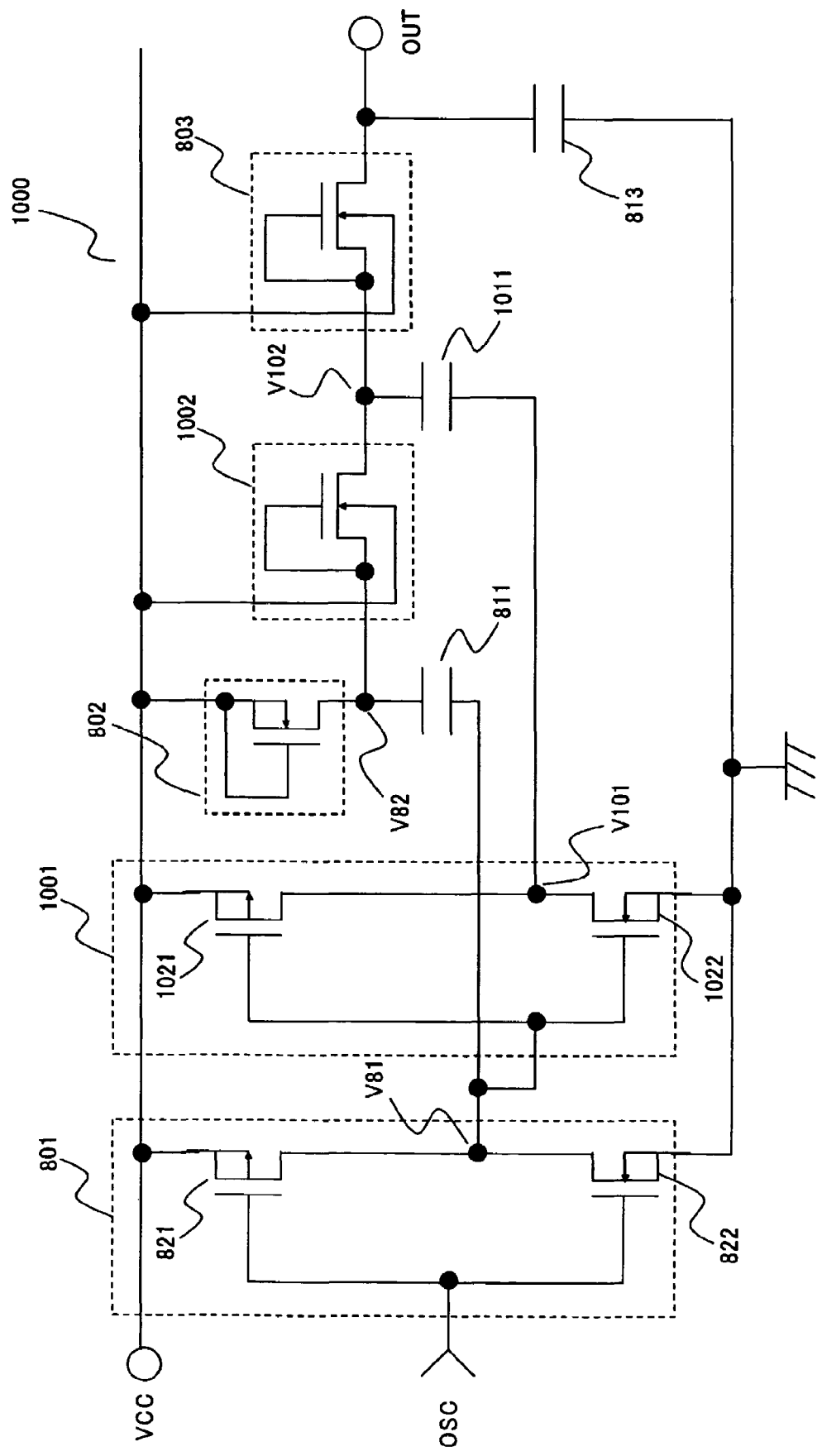
FIG. 10 is a circuit diagram showing an existing two-stage charge-pump circuit.
Figure 11:
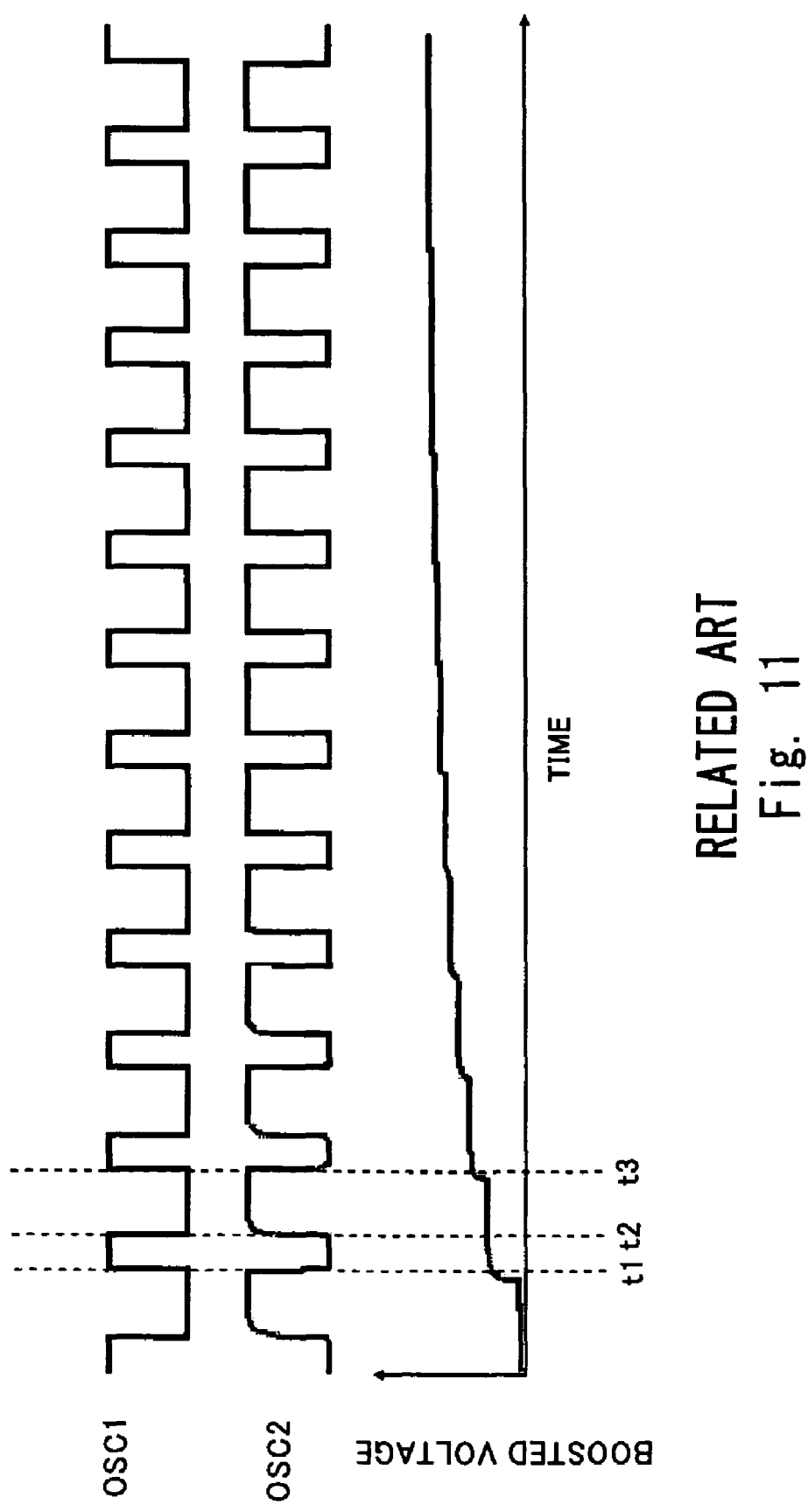
FIG. 11 is a timing chart showing an operation of the existing two-stage charge-pump circuit.
Figure 12:
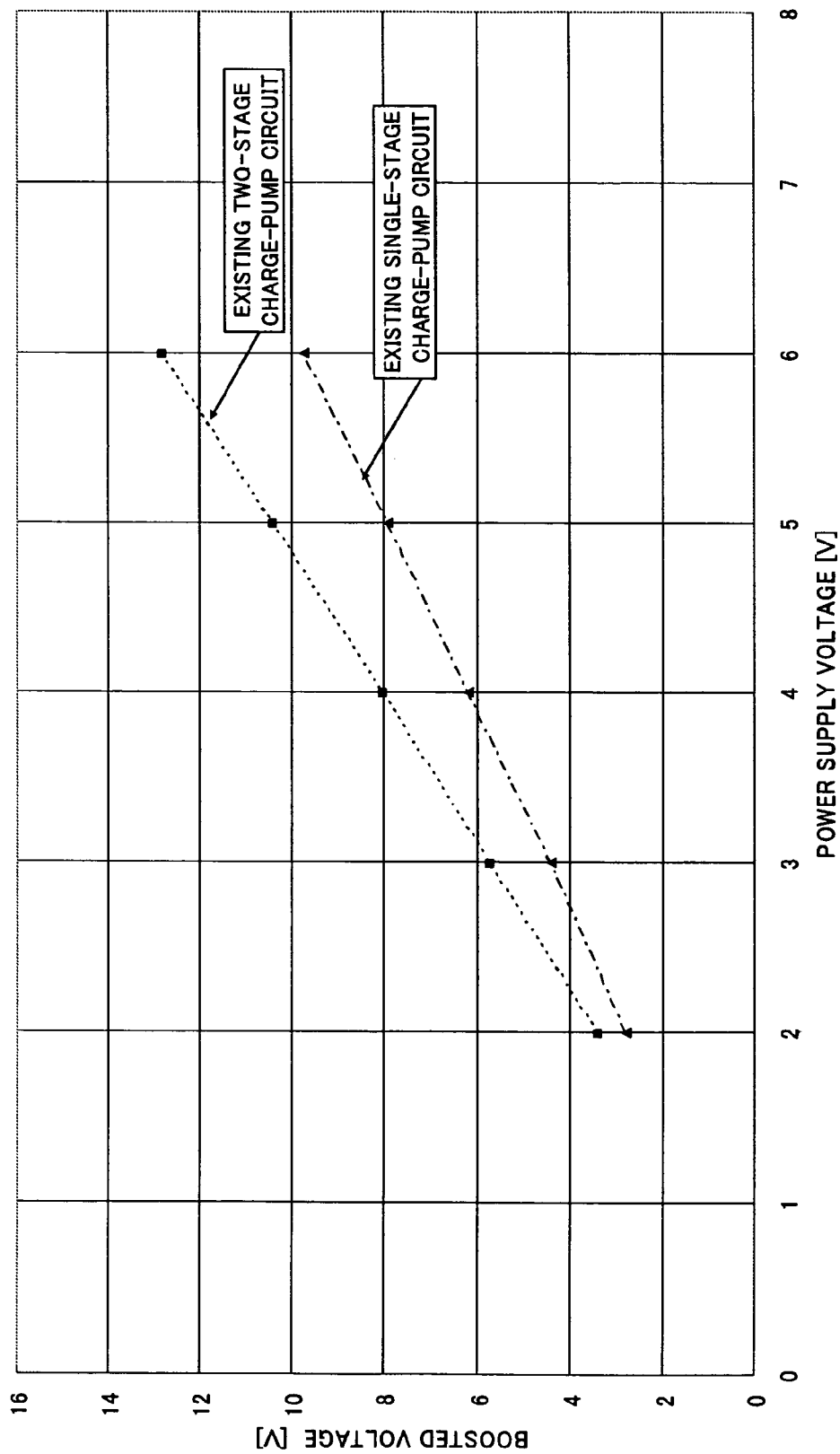
FIG. 12 is a graph showing a result of comparing a boosted voltage relative to a power supply voltage of the existing single-stage charge-pump circuit with that of the existing two-stage charge-pump circuit.

A parasitic capacitance is defined between individual regions of the depletion-type MOSFET 500. FIG. 7 is a schematic diagram of a parasitic load element. A gate oxide film capacitance 701 is defined between the gate electrode 605 and the S/D regions 602. Further, a PN-junction capacitance 702 is defined between the S/D regions 602 and the P-well region 601. These capacitances can be used as a capacitive load element by wiring terminals provided to each region. That is, the well terminal is electrically connected with the backgate but is electrically insulated from the source/drain.

In the charge-pump circuit 500 of the second embodiment, a gate terminal of a depletion-type MOSFET 511 is connected with a node V53 of the first backflow preventative circuit 103, and source and drain terminals are connected with an output (V51) of the first boosting clock driver 101. Thus, a gate oxide film capacitance 701 can replace the first boosting capacitor 111 of the charge-pump circuit of the first embodiment. Further, a backgate terminal of the depletion-type MOSFET 511 is connected with the output (V52) of the second boosting clock driver 102, whereby the PN-junction capacitance 702 can replace the second boosting capacitor 112 of the charge-pump circuit of the first embodiment. Moreover, the output of the charge-pump circuit of the second embodiment is connected with a gate of the enhancement-type MOSFET 512, and a source terminal, a drain terminal, and a well terminal are connected with the ground potential. As a result, the gate oxide film capacitance of the enhancement-type MOSFET 512 can replace the capacitive load 113 of the charge-pump circuit of the first embodiment.

According to the charge-pump circuit of the second embodiment, a parasitic capacitance of one depletion-type MOSFET can replace two boosting capacitors connected in series. That is, the parasitic capacitance of the depletion-type MOSFET is efficiently used to substitute one depletion-type MOSFET for the two capacitive load elements connected in series. Hence, an area for the capacitive elements that make up a large proportion of the chip area can be saved.

In the second embodiment of the present invention, the PN-junction capacitance 702 between the source/drain terminal and the well terminal of the depletion-type N-channel MOSFET 511 is used for the second boosting capacitor 112, and provided below the gate oxide film capacitance 701. Thus, the second boosting capacitor 112 overlaps with the first boosting capacitor 111. As a result, a one-dimensional surface area for the second boosting capacitor 1011 necessary for the existing two-stage circuit can be saved.

As discussed above, in the charge-pump circuit according to the second embodiment of the present invention, the depletion-type MOSFET is used for the boosting capacitor, the gate oxide film capacitance 701 is used for the first boosting capacitor 111, and the PN-junction capacitance 702 is used for the second boosting capacitor 112, so two series-connected capacitive elements can be easily stacked and mounted to a semiconductor device. With this structure, a large semiconductor chip surface area is unnecessary for the boosting capacitor unlike the existing two-stage charge-pump circuit, whereby the boosted voltage higher than that of the two-stage one can be obtained with almost the same semiconductor chip area as that of the single-stage one, leading to a considerable cost reduction of the semiconductor chip.

As set fourth above, the charge-pump circuit of the present invention can obtain a boosted voltage higher than that of the existing two-stage circuit with almost the same chip area as that of the single-stage circuit. Furthermore, the depletion-type MOSFET is used for the boosting capacitor to readily realize the two series-connected boosting capacitors, resulting in a further cost reduction of a semiconductor chip.

It is apparent that the present invention is not limited to the above embodiment that may be modified and changed without departing from the scope and spirit of the invention.

What is claimed is:

1. A charge-pump circuit, comprising:
   clock inputs for receiving clock signals, said clock inputs comprising a first clock terminal and a second clock terminal;
   a field effect transistor having a gate insulating film, a gate terminal, source/drain terminals, and a well terminal connected with a backgate, the well terminal being electrically insulated from the source/drain terminals;
   a first boosting clock driver connected to said first clock terminal, said first boosting clock driver connected with the source/drain and boosting a potential of the gate terminal; and
   a second boosting clock driver connected to said second clock terminal, said second boosting clock driver connected with the well terminal and boosting a potential of the source/drain terminals and the potential of the gate terminal after the first boosting clock driver boosts the potential of the gate terminal.

2. The charge-pump circuit according to claim 1, wherein the field effect transistor comprises a depletion type field effect transistor.

3. The charge-pump circuit according to claim 2, wherein the field effect transistor comprises an N-channel MOSFET.

4. The charge-pump circuit according to claim 1, wherein the first boosting clock driver and the second boosting clock driver include an inverter circuit comprising an N-channel MOSFET and a P-channel MOSFET.

5. The charge-pump circuit according to claim 1, further comprising:
   a backflow preventative circuit preventing backflow of charges from the field effect transistor to the power supply potential,
   wherein the first boosting clock driver includes a first transistor and a second transistor series-connected between a power supply potential and a ground potential, and
   the source/drain terminals are connected to a node between the first transistor and the second transistor, and the backflow preventative circuit is connected between the power supply potential and the node.

6. The charge-pump circuit according to claim 1, wherein the first boosting clock driver boosts the potential of the gate terminal based on a first clock signal, and the second boosting clock driver boosts the potential of the source/drain terminals and the potential of the gate terminal based on a second clock signal.

7. The charge-pump circuit of claim 1, wherein said source and said drain of said field effect transistor and a channel of said field effect transistor all have a same conductivity type.

8. The charge-pump circuit of claim 7, wherein said field effect transistor comprises an N-channel MOSFET as fabricated in a Pwell, said well terminal thereby connecting to said Pwell.

9. The charge-pump circuit of claim 8, wherein all devices in said circuit comprises MOS technology.

10. A charge-pump circuit, comprising:
    a field effect transistor having a gate insulating film, a gate terminal, source/drain terminals, and a well terminal connected with a backgate, the well terminal being electrically insulated from the source/drain terminals;
    a first boosting clock driver connected with the source/drain terminals and boosting a potential of the gate terminal based on a first clock signal; and
    a second boosting clock driver connected with the well terminal and boosting a potential of the source/drain terminals and the potential of the gate terminal after the first boosting clock drive boosts the potential of the gate terminal based on a second clock signal,
    wherein rising edges of the first clock signal and the second clock signal appear at a same time, a falling edge of the first clock signal appears after a predetermined period, and then a falling edge of the second clock signal appears.

11. The charge-pump circuit according to claim 10, further comprising:
    a first backflow preventative circuit connected between the gate terminal and the power supply potential; and
    a second backflow preventative circuit connected between the gate terminal and a capacitive load.

12. The charge-pump circuit according to claim 10,
    wherein the first boosting clock driver includes a first transistor and a second transistor series-connected between a power supply potential and a ground potential, and
    the source/drain terminals are connected to a node between the first transistor and the second transistor, the charge-pump circuit further comprising a backflow preventative circuit is connected between the power supply potential and the node.

13. The charge-pump circuit according to claim 10, wherein the field effect transistor comprises a depletion type field effect transistor.

14. The charge-pump circuit according to claim 13, wherein the field effect transistor comprises an N-channel MOSFET.

15. A boosting method for a charge-pump circuit that includes a field effect transistor having a gate insulating film, a gate terminal, source/drain terminals, and a well terminal connected with a backgate, the well terminal being electrically insulated from the source/drain terminals, said method comprising:

receiving first and second clock signals to drive a first boosting clock driver and a second boosting clock driver, respectively, the first and second clock signals received via a first clock terminal and a second clock terminal, respectively;

boosting a potential of the gate terminal with the first boosting clock driver based on the first clock signal; and boosting a potential of the source/drain terminals and the potential of the gate terminal with the second boosting clock driver based on the second clock signal.

16. The boosting method according to claim 15, wherein the field effect transistor comprises a depletion type field effect transistor.

17. The boosting method according to claim 16, wherein the field effect transistor comprises an N-channel MOSFET.

18. The boosting method according to claim 15, wherein rising edges of the first clock signal and the second clock signal appear at a same time, a falling edge of the first clock signal appears after a predetermined period, and then a falling edge of the second clock signal appears.

* * * * *